Dec. 23, 1952 K. W. GRAYBILL ET AL 2,623,126

AUTOMATIC SWITCHING APPARATUS

Filed June 20, 1950 3 Sheets-Sheet 1

INVENTORS.
KENNETH W. GRAYBILL
HANS SENGEBUSCH

BY [signature]

ATTORNEY

AUTOMATIC SWITCHING APPARATUS

Filed June 20, 1950

3 Sheets-Sheet 2

INVENTORS.
KENNETH W. GRAYBILL
HANS SENGEBUSCH
BY Chas. W. Candy
ATTORNEY

INVENTORS.
KENNETH W. GRAYBILL
HANS SENGEBUSCH
BY
[signature]
ATTORNEY

Patented Dec. 23, 1952

2,623,126

UNITED STATES PATENT OFFICE 2,623,126

AUTOMATIC SWITCHING APPARATUS

Kenneth W. Graybill, Elmhurst, and Hans Sengebusch, Villa Park, Ill., assignors to Automatic Electric Laboratories, Inc., Chicago, Ill., a corporation of Delaware Application June 20, 1950, Serial No. 169,158

12 Claims. (Cl. 179—27.52)

This invention relates to improvements in automatic telephone exchange equipment and more particularly to automatic switching apparatus therefor.

In an automatic telephone exchange it is desirable to have a type of switching apparatus which while attending a large number of lines will not become too bulky, unwieldy, and expensive both to build and to maintain. A compact switching apparatus is of great importance as it will enable a substantial reduction in the amount of exchange space necessary to house such switching equipment as well as reducing manufacturing and maintenance cost as compared with presently employed switching apparatus.

An object of the invention therefore is to provide an improved switching apparatus which will perform a multi-directional rotary movement as well as a radial movement with respect to its axis of rotation.

Another object of the invention is to provide an improved switching apparatus which is compact in size, yet accurate in operation, and capable of serving a greater number of lines.

Still another object of the invention is the provision of a switching apparatus, in keeping with the last-mentioned object, which will readily lend itself to compact exchange installations comprising a plurality of switches of the character set out in the objects hereinbefore.

A further object of the invention is the provision of a switch adapted to placement side by side with similar switches on a common shelf, and being of a type such that quite a large number of shelves of switches so arranged may be placed one above another to make up a switch bay.

A feature of the invention in keeping with the last mentioned object is the provision of sets of contact banks attached to the switch shelves rather than the switches, each set comprising a plurality of banks individual to a particular switch but separate therefrom, and a projection beneath each switch to fit into particular holes in the shelves to readily position the switch on the shelf in operative relation to its individual set of contact banks.

Another feature of the invention resides in the novel mechanism for accomplishing the multi-directional rotary movement of the switching apparatus.

In keeping therewith, another feature of the invention resides in the provision of shifting means which determines both the direction of the rotary motion of the wiper carriage initially as well as the particular radial advancing sequence to be utilized corresponding to the initial rotary direction of the wiper carriage.

And accordingly, a further feature of the invention resides in the ability of each individual switching apparatus to serve a plurality of contact banks.

Another feature of the invention resides in the locking mechanism by which further rotary motion is prohibited during the interim in which the switch is to be moved in its radial movement.

And still another feature of the invention, in keeping with the last-mentioned feature, resides in the novel transmission mechanism which permits a plurality of different directional movements of the switch from a single directional drive mechanism.

These and other objects and features will be more particularly pointed out in the ensuing specification taken in conjunction with the accompanying drawings, in which.

Briefly, the switching apparatus shown as the preferred embodiment in the accompanying drawings provides for 220 point or wiper position banks. The banks in general comprise a plurality of bare wires positioned through holes in insulating plates. In the preferred embodiment, these banks may be fixed rather permanently to switch shelves which are arranged one above the other, each shelf capable of holding a plurality of switches, and of course a plurality of bays of such switch shelves would go into the makeup of an average automatic telephone exchange. The switch is inserted in its place on a shelf, and a centrally located button-like projection on the under side of the switch enters a hole in the shelf which is so positioned as to locate a switch in operative relation to its associated banks. The switch may then be secured in place on its shelf. The switch has a rotatably mounted wiper carriage carrying a wiper unit which in the preferred embodiment shown has four contacting members. The wiper carriage in its normal position is centrally located with respect to the set of banks to be served, that is to say, banks on either side of the wiper mechanism in its normal position.

The drive mechanism steps rotationally always in the same direction and depending upon the position of shifting means controlled by a magnet, the wiper carriage may be rotated either right or left to a particular position in a particular bank of the set served thereby. Locking means controllable also by a magnet is provided and may be operated at this time to lock the wiper carriage from further rotational movement and also to prepare the transmission of the driving mechanism to radially advance the wipers into the row of the bank to which it has been aligned by the previous rotational movement. Release mechanism is provided to disengage the locking means and return the wiper carriage to its normal position.

Figure 5:
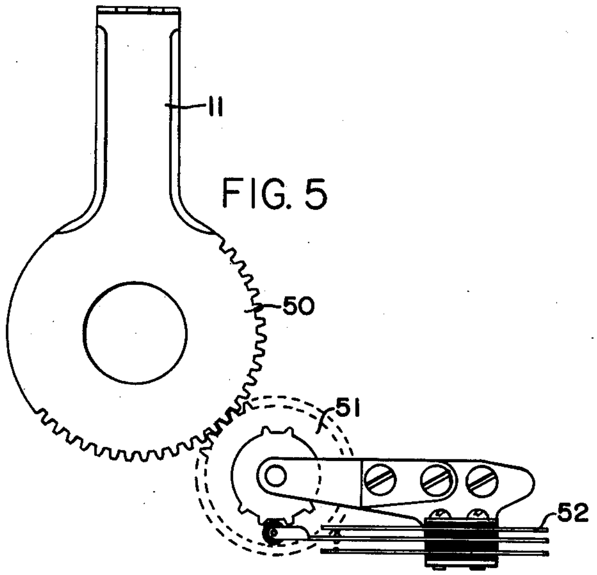
Fig. 5 is a partial plan view showing the optional equipment with which the switch may be provided for purposes to be described hereinafter.
Figure 6:
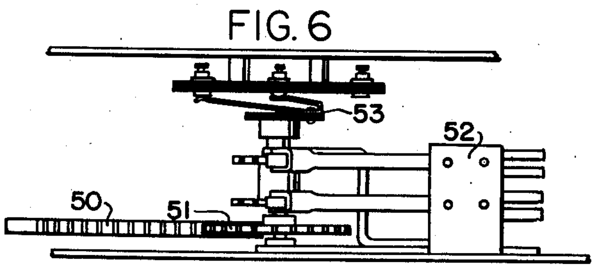
Fig. 6 is a front elevation of the optional equipment shown in Fig. 5.

The optional equipment shown in Figs. 5 and 6 is what might be termed a detachable ten group unit. When this unit is mounted on the switch base it automatically slips into mesh with a wiper carriage gear. This unit may be used under certain conditions when necessary.

A number of contact spring groups have been added to perform such well known functions as off-normal springs, eleventh step springs and the like. Other contact springs (not shown) may be positioned to be operated by any of the magnets shown in the switch for whatever purpose such springs may be desired.

Having briefly described the invention, a detailed description and specification follows:

The switch comprises a base 1 along the front end of which is mounted a drive magnet 2 having an armature 3 and attached thereto, a stepping pawl 4. Stepping pawl 4 is in engagement with a ratchet-tooth pinion 5 which is rigidly affixed to a drive gear 6. Pinion 5 and drive gear 6 are rotatably mounted on base 1 by shaft 7. Pinion 5 and drive gear 6 make up a self contained detachable drive unit having a clock spring (not shown) housed in a spring barrel beneath drive gear 6. This spring normally forces a stop button 8, which is positioned on drive gear 6 against an adjustable stop member 9 affixed to base 1. In this manner it will be understood that gear 6 will at all times be urged to return to its normal position with stop button 8 resting against adjustable stop member 9.

A set of off-normal springs 9*a* is mounted near the adjustable stop and are maintained in normal position by button 5*a* on pinion 5. As soon as pinion 5 is rotated one step, button 5*a* is removed from the spring set operating arm causing the contacts to be operated.

Figure 3:
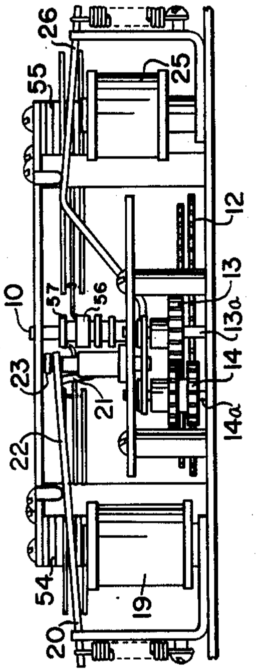
Fig. 3 is a front elevation of the switching apparatus.

Also rotatably mounted to base 1 on a shaft 10 is a wiper carriage 11, part of which is a carriage gear 50. Beneath wiper carriage 11 also rotatably mounted on shaft 10 is a main gear 12. Main gear 12 is normally locked to the wiper carriage 11 so that it will rotate in the same direction as the main gear. Normally an intermediate gear 13, rotatably and slidably mounted on pin 13*a* and positioned between drive gear 6 and main gear 12, is in mesh only with drive gear 6. To one side of intermediate gear 13, rotatably mounted and slidably mounted on pin 14*a* is a dual gear 14, the upper gear of which is normally in mesh with intermediate gear 13 while the lower gear thereof is normally in mesh with main gear 12. This relationship is best seen in Fig. 3.

Therefore, when drive magnet 2 is operated for example by a series of electrical impulses transmitted thereto in well known manner as by means of dial pulses, armature 3 steps pawl 4 to drive pinion 5 and drive gear 6 one step clockwise. As pawl 4 reaches its full stroke dog 15 under the tension of spring 16 is urged into the next adjacent ratchet-tooth to hold the drive gear, which it will be remembered is under a clock spring tension, in its advanced position while pawl 4 falls backward as drive magnet 2 releases after the impulse. And, of course, in this manner drive gear 6 is always stepped clockwise as many steps as correspond to the series of impulses transmitted to drive magnet 2. This stepped motion of drive gear 6 is in turn transmitted to intermediate gear 13 normally in mesh therewith and therefrom to the upper gear of dual gear 14, the lower gear of which is in mesh with main gear 12. Therefore, intermediate gear 13 will rotate counter-clockwise and dual gear 14 will rotate clockwise so that main gear 12 rotates counter-clockwise moving wiper carriage 11 to the left.

At this point it might be well to describe the type of banks served by the mechanism and their location with respect thereto. Normally, as was pointed out in the general description, the banks are connected to the switch shelves and in the preferred embodiment shown in the drawings two sets of radially disposed contact banks are employed side by side with a space between them which is the normal position for wiper carriage 11. These banks of course are arced to correspond with the angular sweep of wiper carriage 11. The banks may be made up of rows of bare wire contacts such as 16 which are positioned through holes in insulating plates such as 17 which are attached to switch shelves 18. The preferred embodiment shows each bank set to have ten rows of contacts therein and each row of contacts comprises four files of contacts eleven contacts deep. Lead wires may be soldered to the ends of these bare wire contacts in well known manner and need not be further described herein.

Returning now, therefore, to the stepping of wiper carriage 11, it will be seen that the wiper carriage is thus stepped to the left into alignment with the four file row of bare wire contacts 16 which corresponds to the number of steps and impulses taken by and transmitted to drive magnet 2. Should it be desired to align the wiper carriage 11 with a row of contacts in the right-hand bank, shift magnet 19 having an armature 20 is first energized. It will be seen that armature 20 of shift magnet 19 is bifurcated as shown at 21 and 22, and the extremities of both 21 and 22 are in turn bifurcated to engage shoulders above and below said extremities provided therefor on two level wiper advancing gear 37 rotatably mounted on shaft 10 and on shaft 23. Shaft 23 in turn is connected as by shoulders and bifurcations in like manner to intermediate gear 13 and dual gear 14 on shafts 13*a* and 14*a* respectively. As all of these gears and connected shoulders are slidable in a transverse direction with relation to base 1, it will be readily seen that when shift magnet 19 is energized, thereby attracting its armature 20, the bifurcations 21 and 22 thereof will depress the gears 37, 13 and 14 on shafts 10, 13$a$ and 14$a$, which will in turn disengage the lower dual gear 14 from main gear 12 and gear 13 will be placed directly in mesh with main gear 12. The action on gear 37 will be described later. As it will be seen in Fig. 3 that intermediate gear 13 is substantially thicker than upper gear of dual gear 14, the upper dual gear 14 will remain in mesh with gear 13 and rotate therewith, but since its lower gear is no longer in engagement with main gear 12, it is of no effect and at this time becomes an idler only.

Now, with magnet 19 energized and assuming that a series of impulses are transmitted to drive magnet 2 as by a calling device in well known manner, stepping pawl 4 drives pinion 5 and attached driving gear 6 clockwise as described before a number of steps corresponding to the series of impulses transmitted. Intermediate gear 13 rotates counterclockwise in mesh therewith causing main gear 12, which it will be remembered is now being driven directly by intermediate gear 13 in a clockwise direction, hence rotating wiper carriage 11 to the right. In this manner the wiper carriage 11 will be aligned with the row of contacts in the right-hand bank which corresponds to the number of impulses transmitted to drive magnet 2 and the number of steps transmitted therefrom to drive gear 6. Therefore, it is seen that the wiper carriage may be rotated in either direction depending upon whether or not a gear shift has been accomplished by a prior operation of shift magnet 19.

Figure 4:
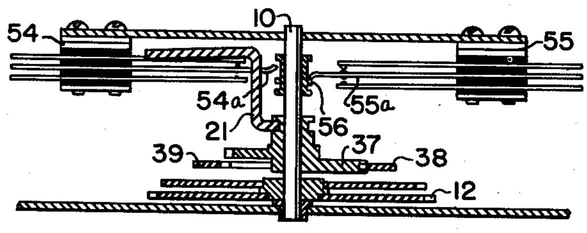
Fig. 4 is a sectional view along line BB in Fig. 1 to more particularly display that part of the switching mechanism which is somewhat obscured from view in Fig. 3.

After the rotary stepping, regardless of the direction thereof, lock magnet 25 having an armature 26 is energized. In so doing, extension 27 of armature 26 depresses arm 28 of rotatable member 29 which in turn causes another arm 30 of the rotatable member positioned on the opposite side of the axis of rotation therefrom to raise. Arm 30 has a curved end 31 in engagement with a notch 32 in a lock bar 33. The lock bar 33 in raising engages one of the slots 34 associated wtih the particular rotary position to which the wiper carriage 11 has been previously rotated. These slots 34 are radially distributed in a slotted lock plate 35 which is affixed to the base. The lock bar 33 in assuming its upward position also disengages main gear 12 from wiper carriage 11 which previously had been attached thereto by means of this lock bar. Therefore, the wiper carriage 11 is now locked by lock bar 33 from further rotation by means of the respective slots 34 corresponding to the advanced portion of the wiper carriage. Now, when a second series of impulses is transmitted to drive magnet 2 which in turn is transmitted to the main gear 12, and assuming shift magnet 19 to be unoperated, radial wiper advancing gear 37 which is a two level gear and can be seen more particularly in Fig. 4 is in mesh with right-hand rack 38 of the wiper mechanism 40 which is slidably mounted on wiper carriage 11. Two level gear 37, although slidable on shaft 10 by bifurcation 21 of the shift magnet, is always connected to main gear 12 by pin 37$a$ so that gear 37 always rotates with main gear 12. Therefore, as the main gear rotates counter-clockwise, radial advancing gear 37 likewise rotates counter-clockwise. Because wiper carriage 11 is locked in its advanced position and cannot rotate further relative to the main gear and radial advancing gear, the wiper carriage 40 is slidably advanced by radial stepping gear 37 in mesh with right-hand rack 38 into the row of the left hand bank to which the wiper carriage has been previously aligned, the teeth on the rack in engagement with the advancing gear 37 corresponding to the number of impulses transmitted so that, for example, if six impulses were transmitted, the radial advancing gear 37 would cause rack 38 to advance the wiper mechanism six steps into the aligned row of contacts. At the forward extremity of the wiper mechanism 40 project two pairs of wipers 41 which engage respectively the four bare wire contacts at the sixth radial step in the row to which the wiper carriage 11 is aligned.

Assuming now, however, that both shift magnet 19 and lock magnet 25 had been energized previous to the transmission of the second series of impulses the drive magnet 2, and assuming again that the series of impulses transmitted to the drive magnet is six, the drive gear through the intermediate gear 13 will rotate main gear 12 clockwise. The wiper carriage 10 as described before will be locked into its respective slot 34 of lock plate 35 so that it does not move. Also remembering that shift magnet 19 has been energized to effect clockwise rotation of the carriage to right-hand bank, bifurcation extension 21 of armature 20 of shift magnet 19 depresses two level gear 37 on shaft 10 so that the other level of gear 37 is now depressed into mesh with left-hand rack 39 of the wiper mechanism 40 and is no longer in engagement with right-hand rack 38 as it was in the previous case when shift magnet 19 was not operated. Therefore, rotation of wiper advancing gear 37, now in mesh with left-hand rack 39 will advance the wiper mechanism 40 and wipers 41 into the row of the right-hand bank to which carriage 11 is aligned a number of contacts corresponding to the number of impulses sent in the second series. As it was assumed that this second series of impulses was six in number, wipers 41 are in contact with the four wire contacts at the sixth radial position into the row to which the carriage had been previously aligned.

Figure 1:
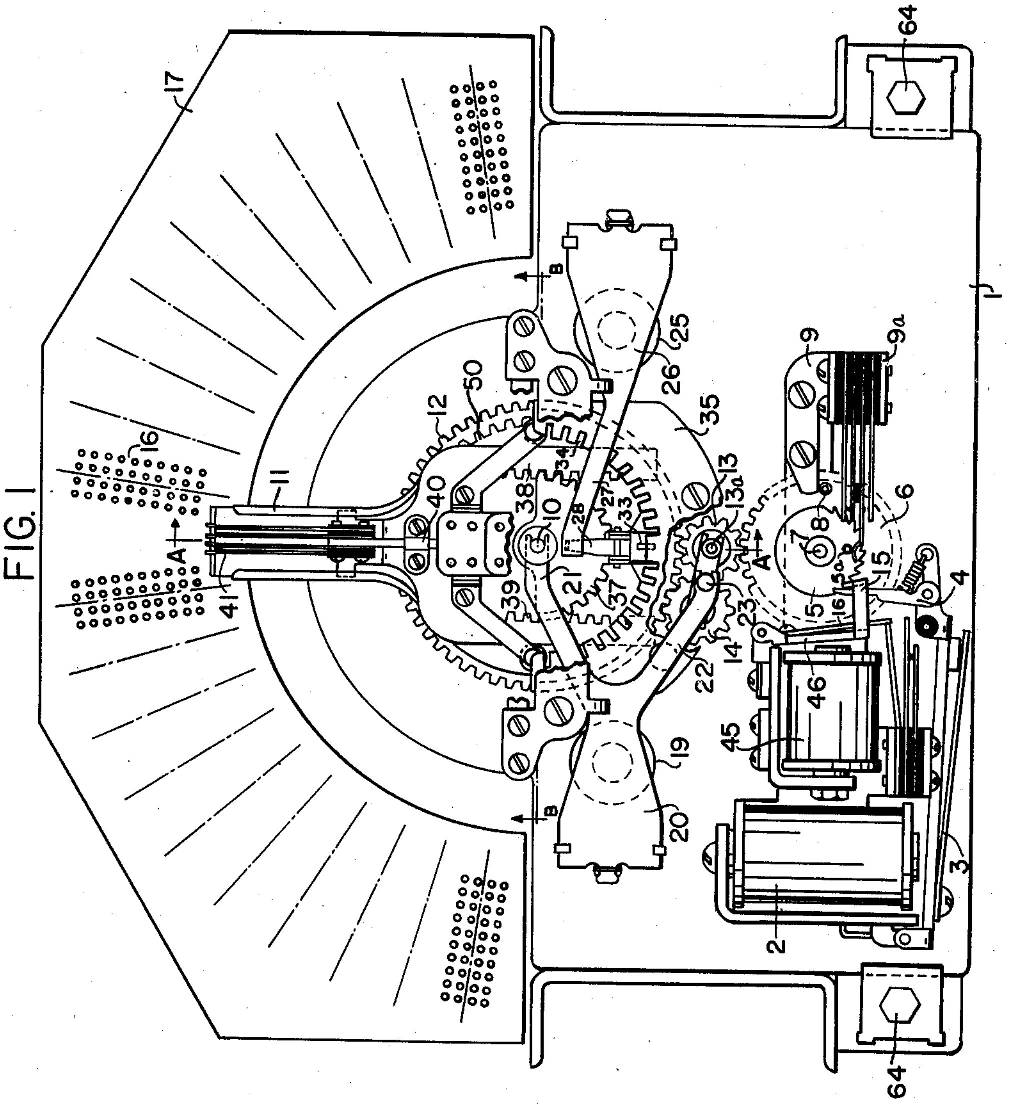
Fig. 1 is a plan view of a single switching mechanism shown in operational relation to its associated set of contact banks.
Figure 2:
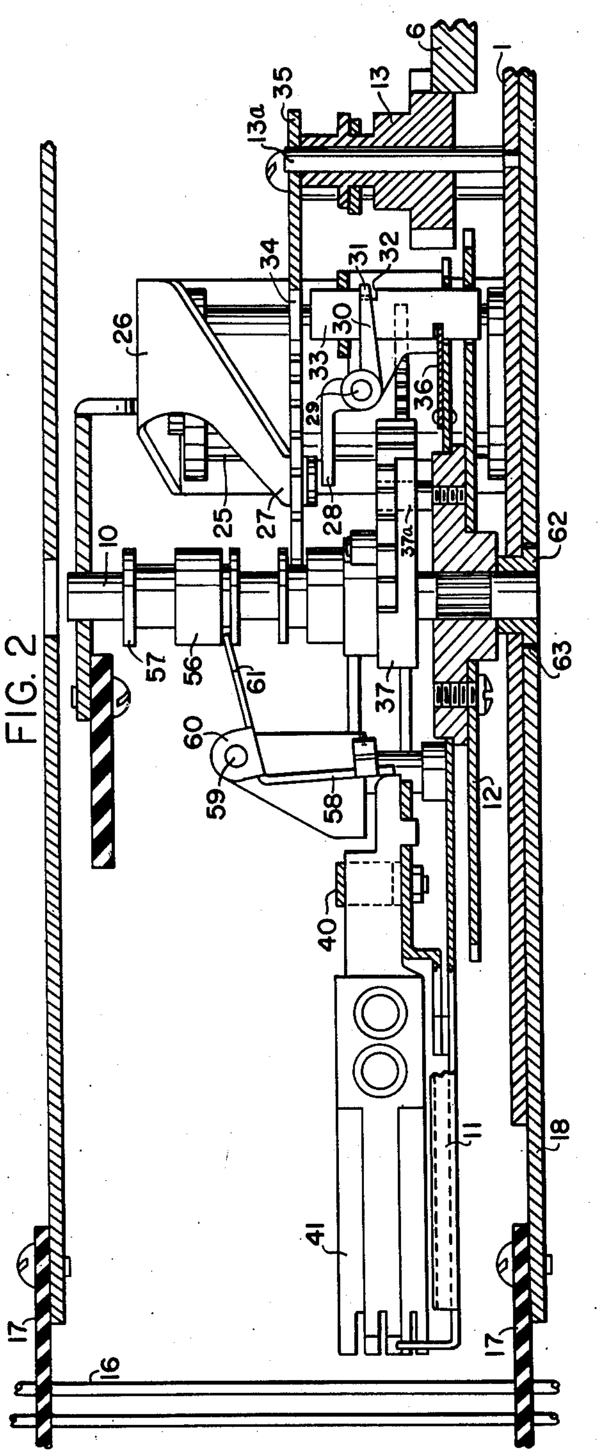
Fig. 2 is a sectional view of the switching apparatus taken along line AA in Fig. 1.

Release of the switch is accomplished in the following manner: release magnet 45 is energized to attract its armature 46 which in turn draws dog 15 attached thereto out of engagement with pinion 5 as well as drawing stepping pawl 4 before it also out of engagement with pinion 5. As it will be remembered that the drive gear 6 was being stepped against the tension of a clock spring (not shown), this clock spring is now free to release its stored energy to cause the drive gear 6 and attached pinion 5 to rotate counter-clockwise. As drive gear 6 is urged counter-clockwise, it transmits its motion to main gear 12, either through intermediate gear 13 and dual level gear 14, or if shift magnet 19 has been energized, to the main gear 12 through intermediate gear 13. The main gear 12 then, if the wipers are in the left-hand bank will rotate clockwise as will two level advancing gear 37 along with it causing right-hand rack 38 to withdraw wiper mechanism 40 from its position within the bank; or if shift magnet 19 had been operated so that the wiper carriage was aligned in the right-hand bank, the main gear will be rotated counter-clockwise, two level gear 37 rotating likewise therewith counter-clockwise to cause left hand rack 39 to withdraw wiper mechanism 40 from its radial position within whichever row of the bank to which it had been aligned. When either rack has caused the wiper mechanism to return to its radial normal position, that is, when the wipers have been withdrawn completely from the row of contacts to which the carriage is aligned, the lock magnet is then released so that lock bar 33 is urged downward under tension of spring 36 to assume its normal position whereby it no longer locks the wiper carriage in a slot 34 of lock plate 35, but again locks the wiper carriage 11 to main gear 12. In this manner, under the continued urging of the clock spring on drive gear 6, the main gear now returns the wiper carriage toward its centrally located normal position. This movement continues until stop button 8 engages adjustable stop plate 9 which is adjustable to correspond to the centrally normal position of the wiper carriage and wiper mechanism as is shown in Fig. 1.

The optional additional equipment to provide a tens group for the switch where necessary in an automatic telephone system, and which is shown in Figs. 5 and 6 comprises a carriage gear 50 on the wiper carriage 11, and a tens group gear 51 rotatably mounted to the base so as to be in mesh therewith. This gear by means of cams on its shaft operates various contact springs which are shown at 52 and 53 and perform functions which in Strowger parlance operate as level wiper and normal post springs. As was stated before this unit is optional and may be used only when needed.

Other sets of contact springs, such as 54 and 55 are best seen in Figs. 3 and 4. The operating arms 54*a* and 55*a* of spring sets 54 and 55 respectively are operated when shoulders 56 and 57 slidably mounted on shaft 10 are respectively raised or lowered. The position of the springs as shown is normal and occurs when arm 58 of rotatable member 60 mounted on shaft 59 is rotated counter-clockwise by abutment of wiper mechanism 40 returning to radial normal position. This in turn raises arm 61 in engagement with shoulder 56 to slide shoulder 56 upward. When the wiper mechanism 40 is advanced radially off-normal, arms 58 and 61 rotate clockwise, shoulders 56 and 57 slide downwards on shaft 10 both under weight of the arms of rotatable member 60 and spring tension of operating arm 55*a*.

The mechanism of the switch as described is all built upon the switch base 1. The switch has a button-like projection 62 extending from the underside of base 1. This projection 62 fits into a hole 63 in the switch shelf 18. The holes 63 in the switch shelves are at predetermined positions so that when a switch projection 62 is fitted therein, the switch is in operative relationship to the set of contact banks to be served by the particular switch in question. Once positioned by means of button 62, the switch may be secured to the self by a well-known fastening expedient as shown at 64.

Additional switches may likewise be positioned adjacent one another on the shelf 18 to serve other banks of contacts such as 16 affixed thereto, and a number of such shelves of switches then mounted one above another to make up a switch bay.

Although I have described in detail a preferred embodiment of my invention, it will be understood that without departing from the true spirit of the invention, other modifications and uses for the switch are possible and contemplated. Accordingly, what is claimed and desired to be protected by issuance of Letters Patent of the United States is:

1. In an automatic switch, a plurality of contact banks, a rotatably mounted wiper having access thereto, means for rotating said wiper in one direction to a predetermined position in alignment with a row in one of said banks, shifting means comprising a relay having a bifurcated armature, one fork of said armature operable to condition said first means to rotate said wiper in another direction to a predetermined position in alignment with a row in another of said banks, and means controlled by the other fork of said armature when said wiper reaches any of said predetermined positions for cooperating with said first means to advance said wiper into the predetermined position in the bank to which it is aligned.

2. In an automatic switch, a plurality of contact banks, a plurality of rows of contacts in each bank, a rotatably and slidably mounted wiper mechanism having access thereto, a wiper connected to said wiper mechanism, means for rotating said wiper mechanism in one direction into alignment with a particular row in one of said banks, and shifting means for conditioning said first means to rotate said wiper in an opposite direction into alignment with a particular row in another of said banks, means controlled by said shifting means when said wiper mechanism is in alignment with a particular row in one of said banks for conditioning said first means to slidably advance said wiper in said particular row, other means controlled by said shifting means when said wiper is in alignment with a particular row in another of said banks for conditioning said first means to slidably advance said wiper in said particular row.

3. In an automatic switch, a plurality of contact banks, a plurality of rows of contacts in each bank, a rotatably and slidably mounted wiper having access thereto, means for rotating said wiper in either of two directions into alignment with a particular row in one of said banks, dual means for slidably advancing said wiper into engagement with particular contacts in said aligned rows, and shifting means operable to determine in which direction said first means is to rotate said wiper as well as determining which of said dual means is to slidably advance said wiper into an aligned bank row.

4. In an automatic switch, a plurality of contact banks, a plurality of rows in each bank, a rotatably and slidably mounted wiper, one end of said wiper having access to said banks, the other end of said wiper being bifurcated, a series of gears for rotating said wiper in one direction into alignment with any row of one of said banks, a common wiper advancing gear, and a rack on one fork of said wiper associated with said series of gears for advancing said wiper into the aligned row; and an additional gear in mesh with said series of gears for rotating said wiper in an opposite direction into alignment with any row of another of said banks, and a second rack on the other fork of said wiper associated with said additional gear for cooperating with said common wiper advancing gear to advance said wiper into the aligned row in said other bank.

5. In an automatic switch as claimed in claim 4, shifting means operable for moving said additional gear out of operational enaggement with said series of gears as well as for intermeshing said second rack with said common wiper advancing gear while disengaging said first mentioned rack therefrom.

6. In an automatic switch as claimed in claim 5, locking means for securing said wiper from further rotational movement after said wiper has been rotated into alignment with a row in one of said banks.

7. In an automatic switch, a plurality of contact banks, a plurality of rows of contacts in each bank, a rotatably mounted wiper carriage, a wiper slidably mounted on said carriage, one end of said wiper having access to said banks the other end of said wiper being bifurcated, a main gear, a series of gears including said main gear for rotating said carriage in one direction into alignment with any row of one of said banks, a common wiper advancing gear connected to said main gear, and a rack on one fork of said wiper to mesh therewith associated with said series of gears for sliding said wiper into the aligned row, an additional gear in mesh with said series of gears for rotating said wiper in an opposite direction into alignment with any row of another of said banks, a second rack on the other fork of said wiper to mesh with said common wiper advancing gear associated with said additional gear for sliding said wiper into the aligned row in said other bank, a lock bar normally coupling said carriage to said main gear, a locking plate having a plurality of slots therein, each of said slots corresponding to individual rows of contacts in said banks, an electromagnet and means controlled by said electromagnet for raising said lock bar after said carriage has been aligned with a row in either of said banks, said lock bar in being raised uncoupling said carriage from said main gear and locking said carriage, against further rotation, to the slot in said locking plate corresponding to the aligned row so that said common advancing gear may now slidably advance said wiper into the row of bank contacts aligned therewith under control of said main gear.

8. In an automatic switch as claimed in claim 7, a driving gear in mesh with said series of gear, electromagnet stepping means to rotate said driving gear to rotate said wiper carriage and advance said wiper, moving said driving gear always in the same direction responsive to impulses received by said magnet regardless of the direction in which the carriage is to be rotated, and a dog for holding said driving gear after any given step.

9. In an automatic switch as claimed in claim 8, means including the lock bar raising magnet for removing said dog from said driving gear for returning said carriage and wiper to normal.

10. In an automatic switch, a wiper, a contact bank accessible thereto, means including a pair of parallel gear racks rigidly secured to said wiper for moving said wiper into engagement with certain of said contacts, a rotatable gear having two segments, and means for raising said gear to cause one segment to engage one rack to move the wiper and for lowering the gear to cause the other segment to engage the other rack to move said wiper.

11. In an automatic switch, a rotatably mounted drive gear, means for rotating said drive gear in one direction, a rotatably mounted slidable member, a shiftable transmission for transforming the unidirectional rotation of said drive gear to rotation in either of two directions and transmitting said transformed rotation to said slidable member, and other means comprising a two level gear for utilizing said transmitted rotation to slide said slidable member in one particular direction irrespective of the direction of the transformed rotation.

12. In an automatic switch as claimed in claim 11, said member comprising a pair of parallel inverted gear racks, said two level gear being engageable therewith.

KENNETH W. GRAYBILL.
HANS SENGEBUSCH.

REFERENCES CITED

The following references are of record in the file of this patent:

UNITED STATES PATENTS

| Number | Name | Date |
|---|---|---|
| 1,460,913 | Lienzen et al. | July 3, 1923 |
| 1,995,025 | Ellmore | Mar. 19, 1935 |
| 2,239,329 | Lindstrom | Apr. 22, 1941 |
| 2,340,445 | Willis | Feb. 1, 1944 |

FOREIGN PATENTS

| Number | Country | Date |
|---|---|---|
| 85,768 | Sweden | Mar. 10, 1936 |